Figure 10:
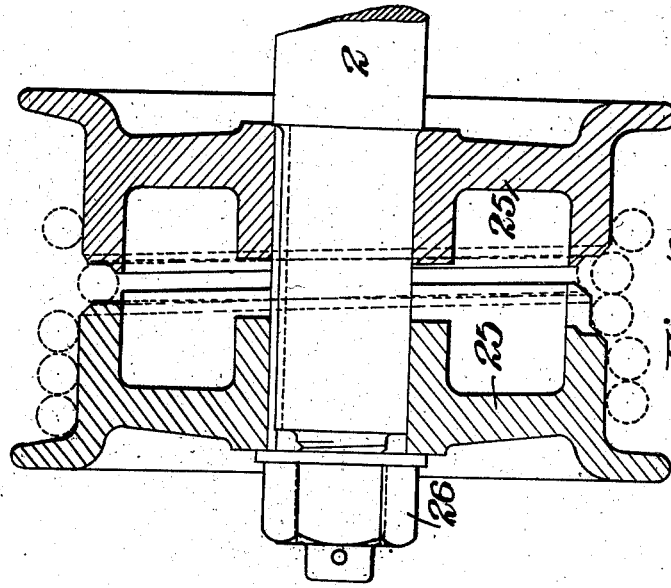

No. 748,221. PATENTED DEC. 29, 1903.
G. H. SHEFFIELD & J. D. TWINBERROW.
DOOR AND APPARATUS THEREFOR FOR USE UPON HOPPER WAGONS.
APPLICATION FILED SEPT. 5, 1903.
NO MODEL. 10 SHEETS—SHEET 1.
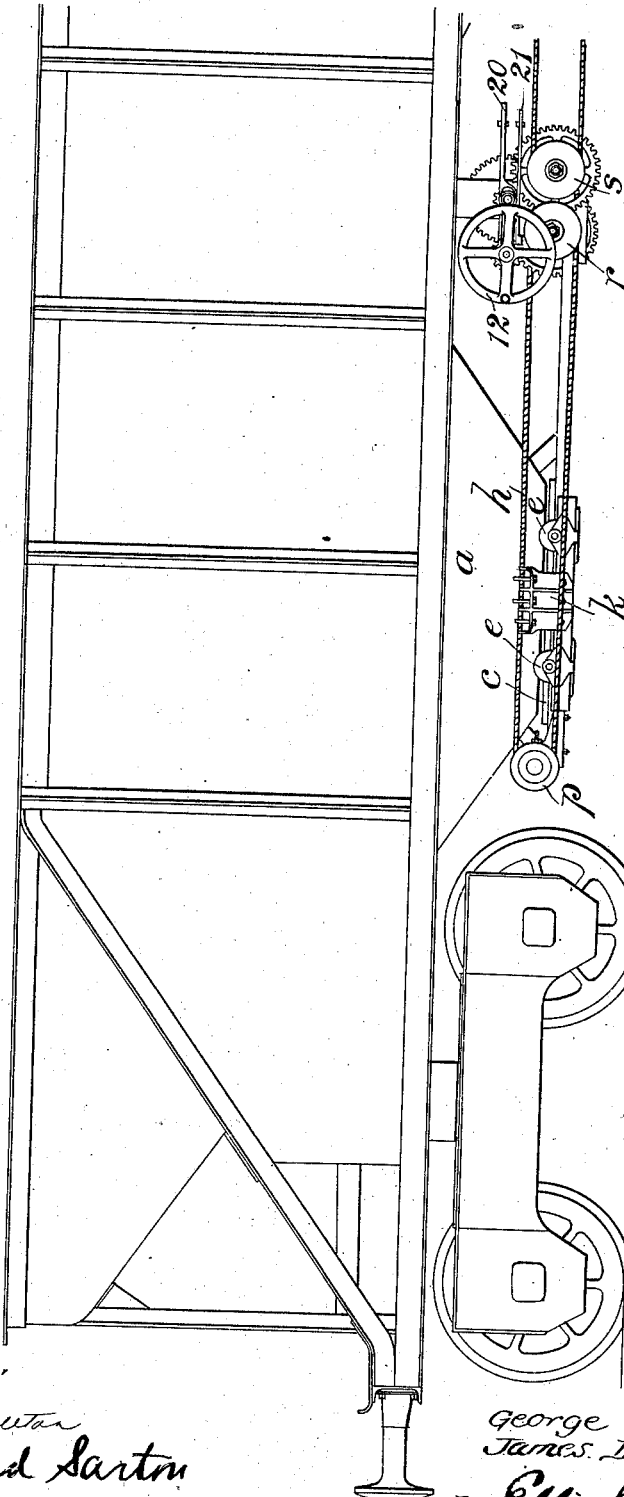

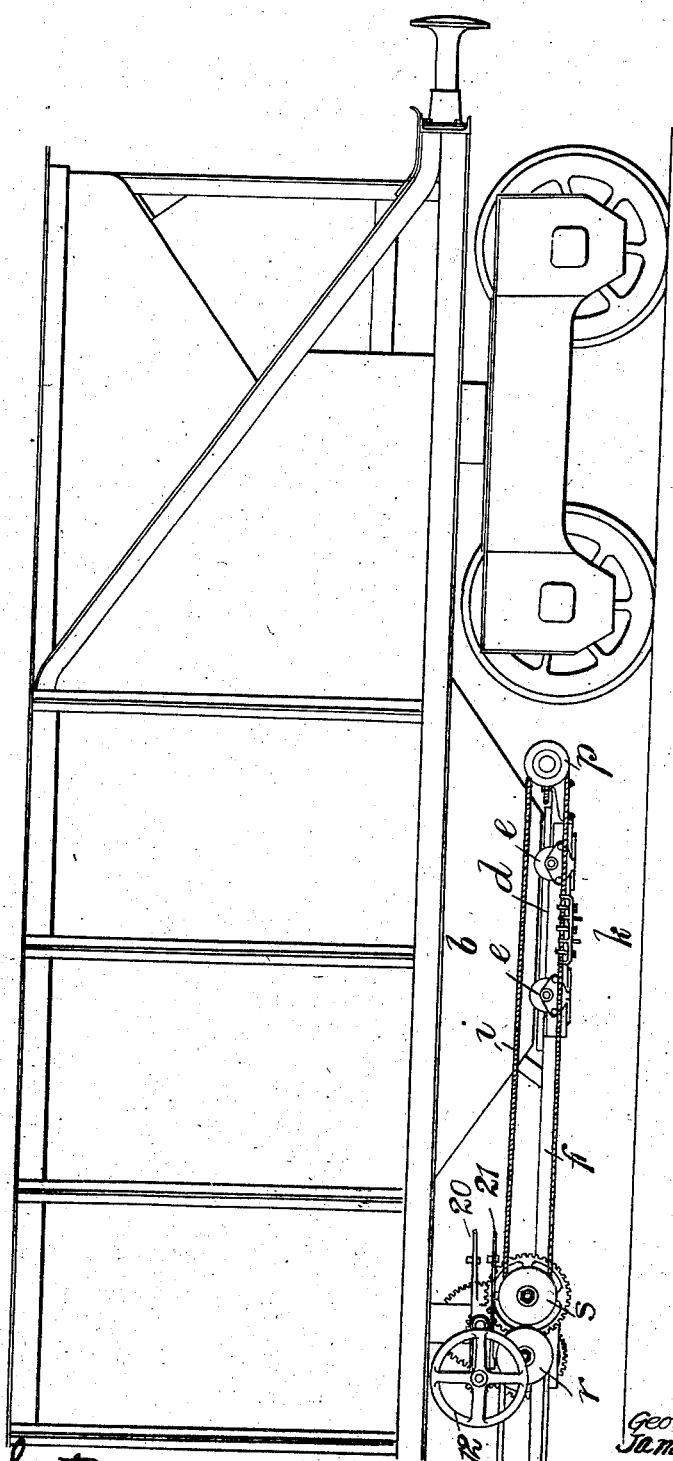

No. 748,221. PATENTED DEC. 29, 1903.
G. H. SHEFFIELD & J. D. TWINBERROW.
DOOR AND APPARATUS THEREFOR FOR USE UPON HOPPER WAGONS.
APPLICATION FILED SEPT. 5, 1903.
NO MODEL. 10 SHEETS—SHEET 3.
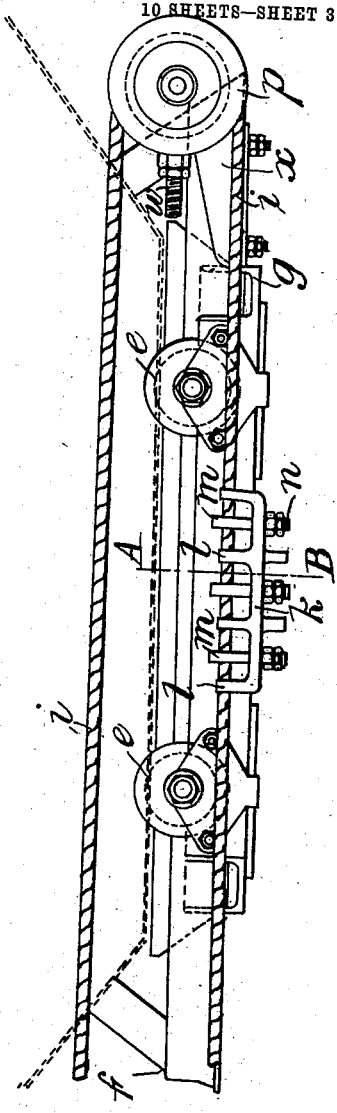
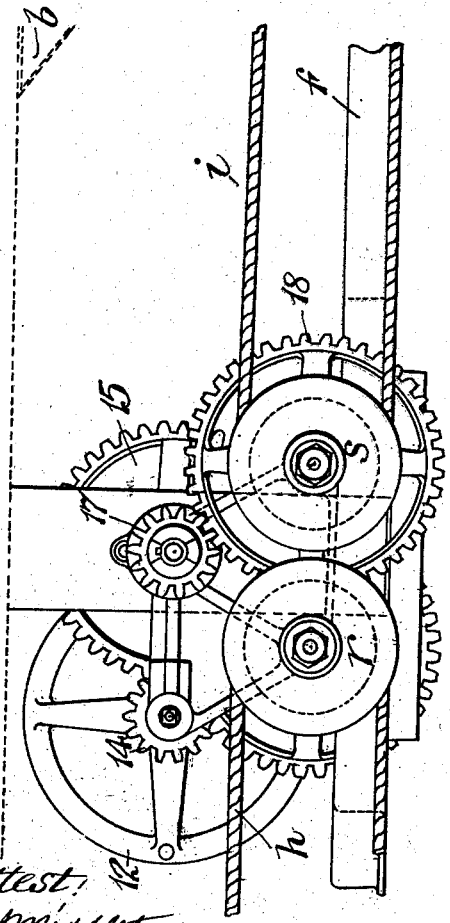
Fig. 2.
Attest:
C. J. Middleton
Edward Santon
Inventors.
George H. Sheffield,
James D. Twinberrow
by Ellis Spear & Company
Attys No. 748,221. PATENTED DEC. 29, 1903.
G. H. SHEFFIELD & J. D. TWINBERROW.
DOOR AND APPARATUS THEREFOR FOR USE UPON HOPPER WAGONS.
APPLICATION FILED SEPT. 5, 1903.
NO MODEL. 10 SHEETS—SHEET 4.
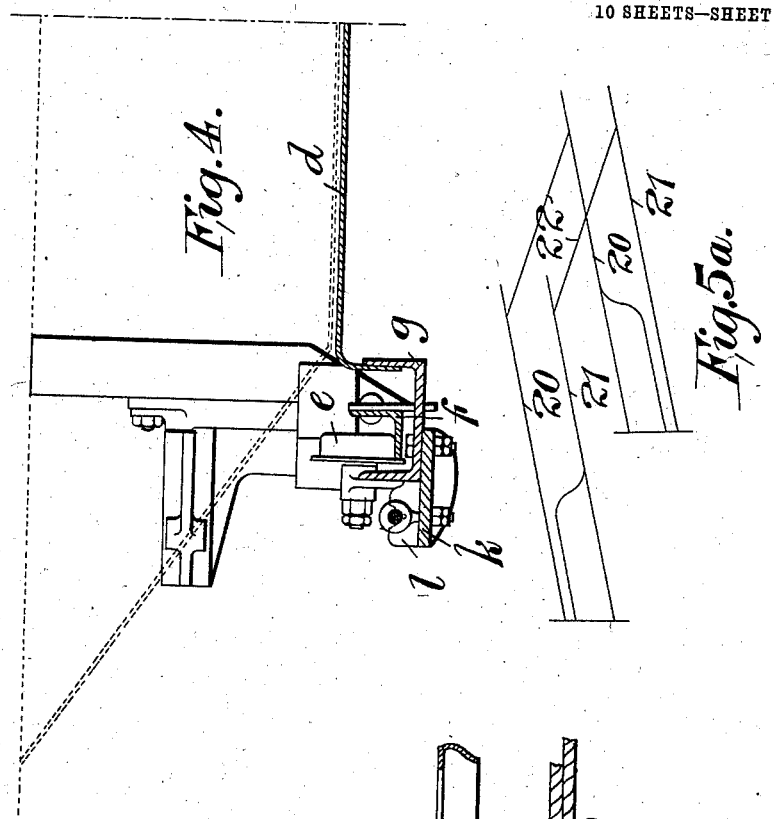
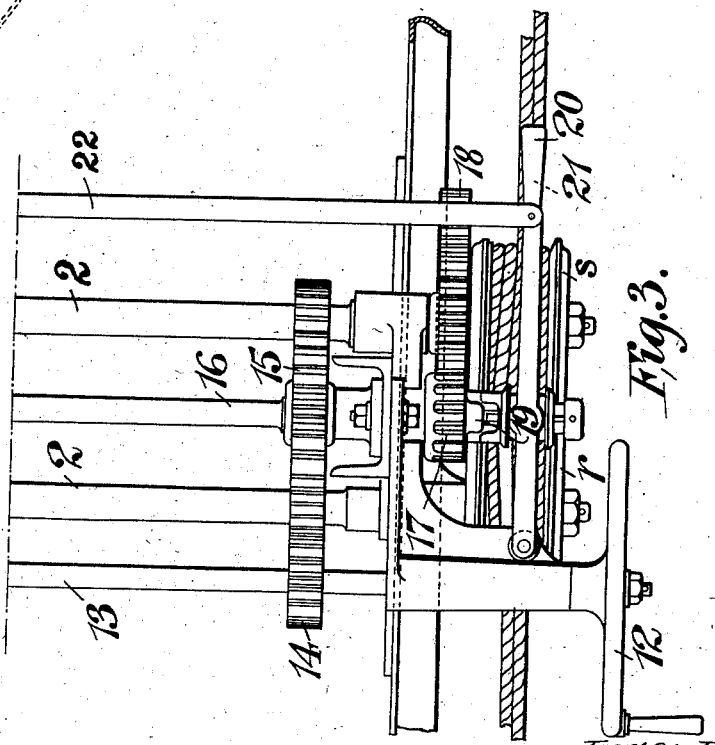

No. 748,221. PATENTED DEC. 29, 1903.
G. H. SHEFFIELD & J. D. TWINBERROW.
DOOR AND APPARATUS THEREFOR FOR USE UPON HOPPER WAGONS.
APPLICATION FILED SEPT. 5, 1903.
NO MODEL. 10 SHEETS—SHEET 5.
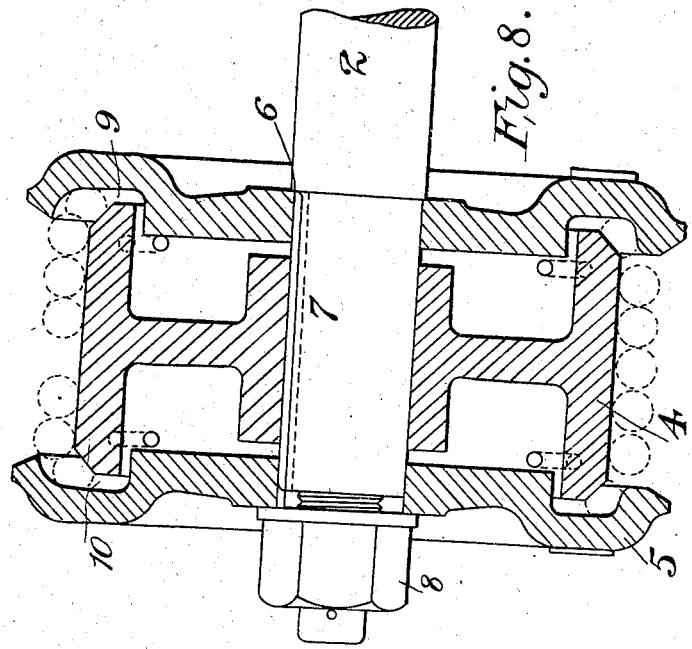
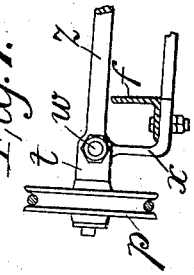
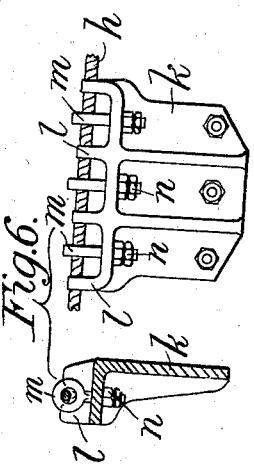
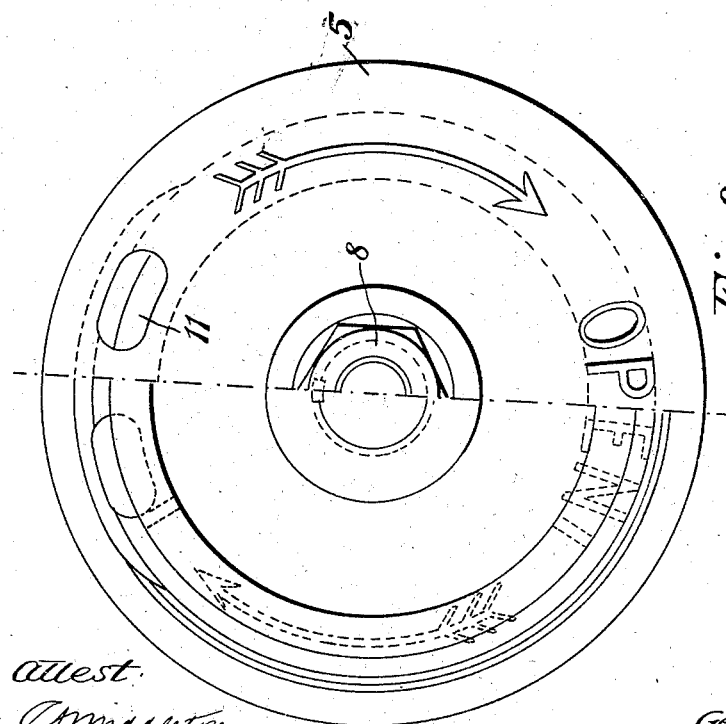
Attest:
C. H. Marston
Edward Sarton
Inventors
George H. Sheffield
James D. Twinberrow
by Ellis Spear & Company
Attys No. 748,221. PATENTED DEC. 29, 1903.
G. H. SHEFFIELD & J. D. TWINBERROW.
DOOR AND APPARATUS THEREFOR FOR USE UPON HOPPER WAGONS.
APPLICATION FILED SEPT. 5, 1903.
NO MODEL. 10 SHEETS—SHEET 6.

No. 748,221. PATENTED DEC. 29, 1903.
G. H. SHEFFIELD & J. D. TWINBERROW.
DOOR AND APPARATUS THEREFOR FOR USE UPON HOPPER WAGONS.
APPLICATION FILED SEPT. 5, 1903.
NO MODEL. 10 SHEETS—SHEET 7.
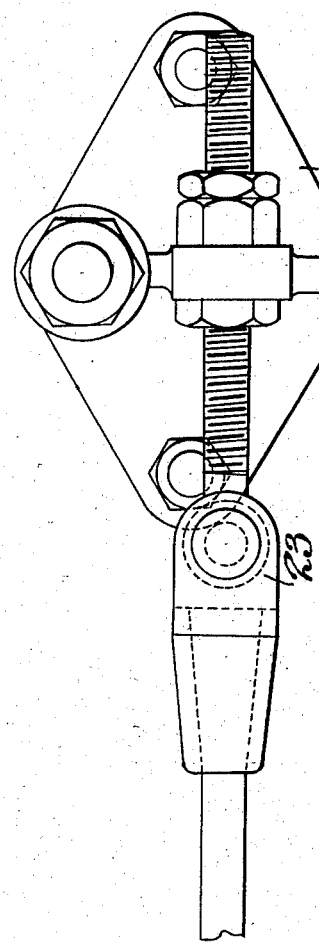
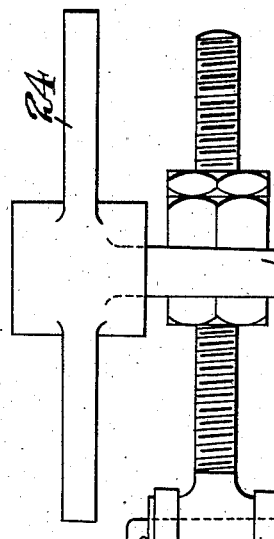
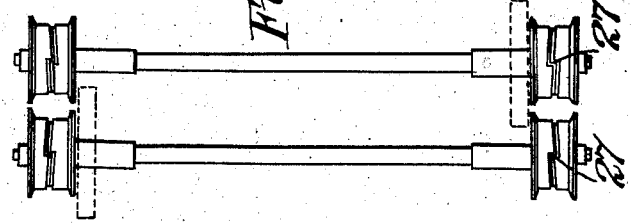
Inventors,
George H. Sheffield
James D. Twinberrow.

No. 748,221. PATENTED DEC. 29, 1903.
G. H. SHEFFIELD & J. D. TWINBERROW.
DOOR AND APPARATUS THEREFOR FOR USE UPON HOPPER WAGONS.
APPLICATION FILED SEPT. 5, 1903.
NO MODEL. 10 SHEETS—SHEET 8.

Attest:
C. J. Middleton
Edward Saxton

Inventors.
George H. Sheffield
James D. Twinberrow.
by Ellis Spear & Company
Attys No. 748,221. PATENTED DEC. 29, 1903.
G. H. SHEFFIELD & J. D. TWINBERROW.
DOOR AND APPARATUS THEREFOR FOR USE UPON HOPPER WAGONS.
APPLICATION FILED SEPT. 5, 1903.
NO MODEL. 10 SHEETS—SHEET 9.

No. 748,221. Patented December 29, 1903.

UNITED STATES PATENT OFFICE.

GEORGE HARRISON SHEFFIELD AND JAMES DENIS TWINBERROW, OF NEWCASTLE-UPON-TYNE, ENGLAND.

DOOR AND APPARATUS THEREFOR FOR USE UPON HOPPER-WAGONS.

SPECIFICATION forming part of Letters Patent No. 748,221, dated December 29, 1903.

Application filed September 5, 1903. Serial No. 172,170. (No model.)

*To all whom it may concern:*

Be it known that we, GEORGE HARRISON SHEFFIELD and JAMES DENIS TWINBERROW, subjects of the King of Great Britain and Ireland, residing at 15 New Bridge street, Newcastle-upon-Tyne, England, have invented certain new and useful Improvements in Connection with Doors and the Apparatus Therefor for Use upon Hopper-Wagons, (for which we have made application for Letters Patent in Great Britain, No. 19,446, bearing date September 4, 1902; in India, No. 522/02, bearing date December 29, 1902, and in Germany, application filed May 23, 1903,) of which the following is a specification.

This invention relates to methods of operating and the apparatus employed upon doors for use upon hopper-wagons for railways and the like, more especially in cases wherein the doors are operated by winding-gear, the object being to provide effective and readily-controlled gearing, so arranged that the doors—usually two in number—may be either simultaneously or independently operated, such gearing being also arranged for manipulation from either side of the wagon.

The invention consists in arranging the gearing for the winding-drums in such manner that the latter may be simultaneously rotated or on the manipulation of a suitable clutch or clutches either one or other pair of drums may be rendered inoperative, so that operation of the gearing simply drives one pair of drums to open or shut the respective door.

The invention also consists in so arranging the gearing by the employment of differential gear that the doors may be opened simultaneously but at rates proportional to their resistances or so that one door may be opened at twice its usual speed if the other is jammed.

The invention still further consists in special arrangements and constructions of gearing and details connected therewith for effectively operating the doors hereinafter fully described.

Several modes of carrying out the invention are illustrated in the accompanying drawings, wherein—

Figure 11:
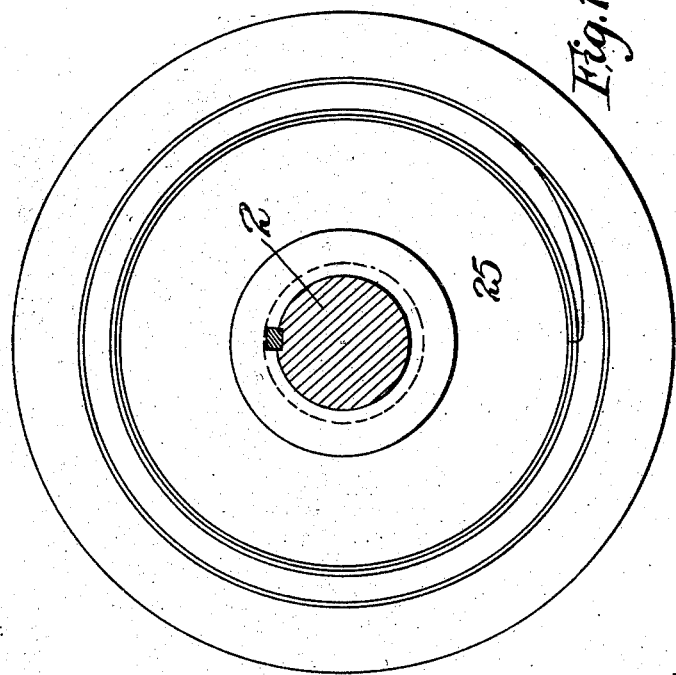
Figure 15:
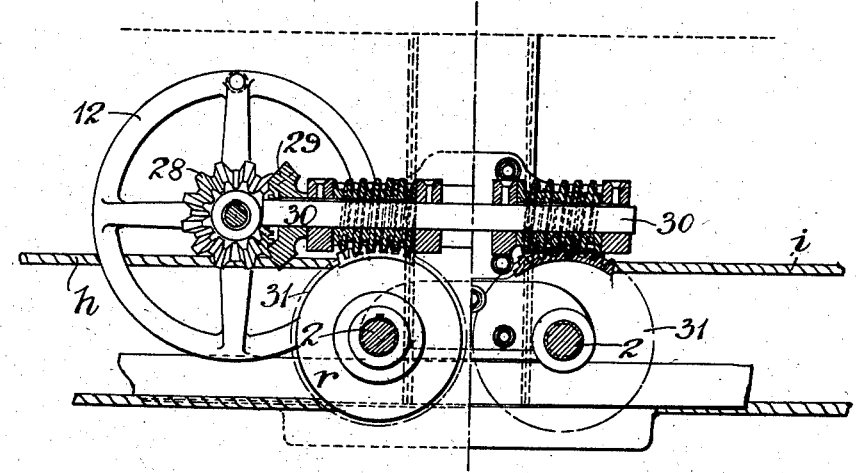
Figure 16:
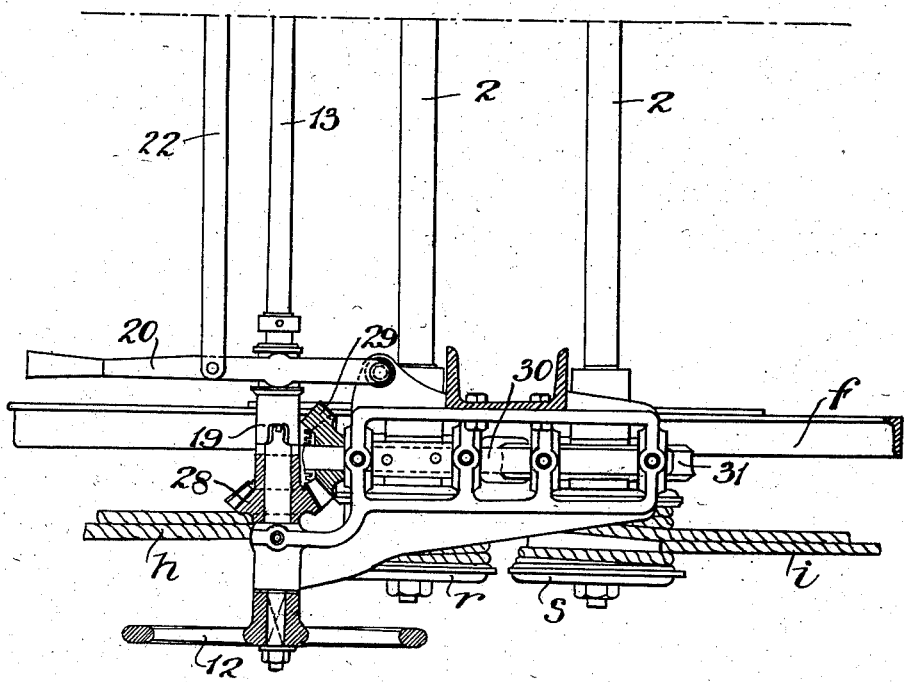
Figure 17:
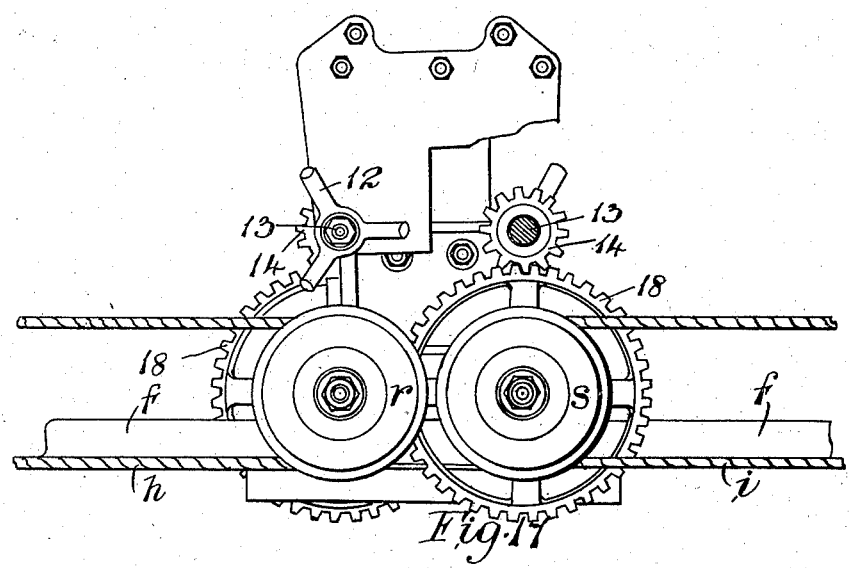
Figure 18:
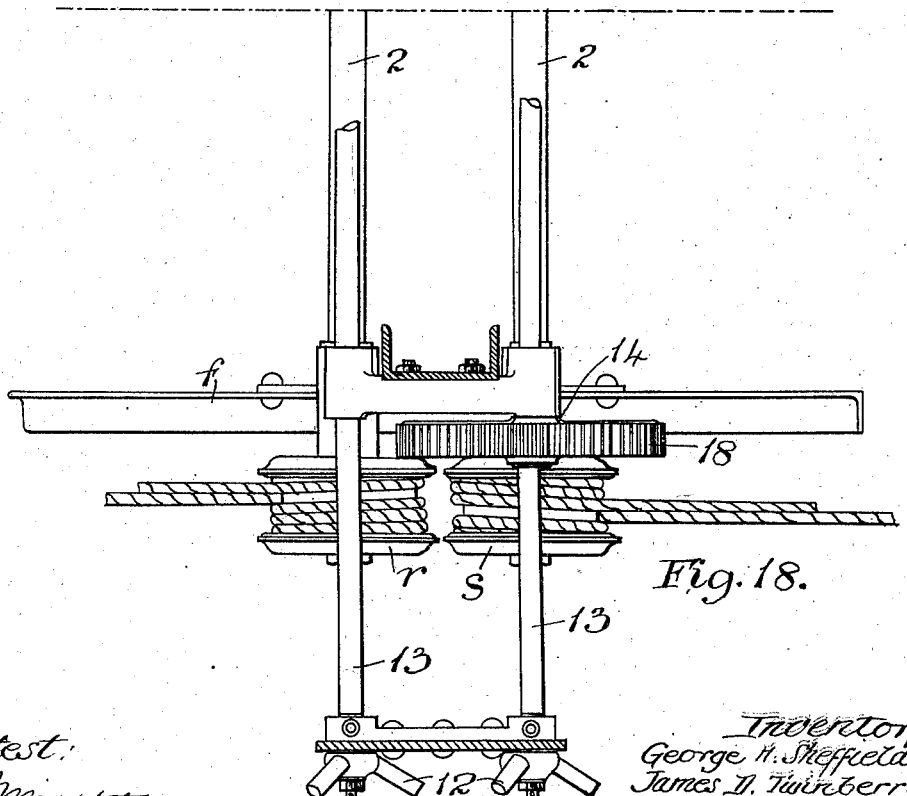
Figure 19:
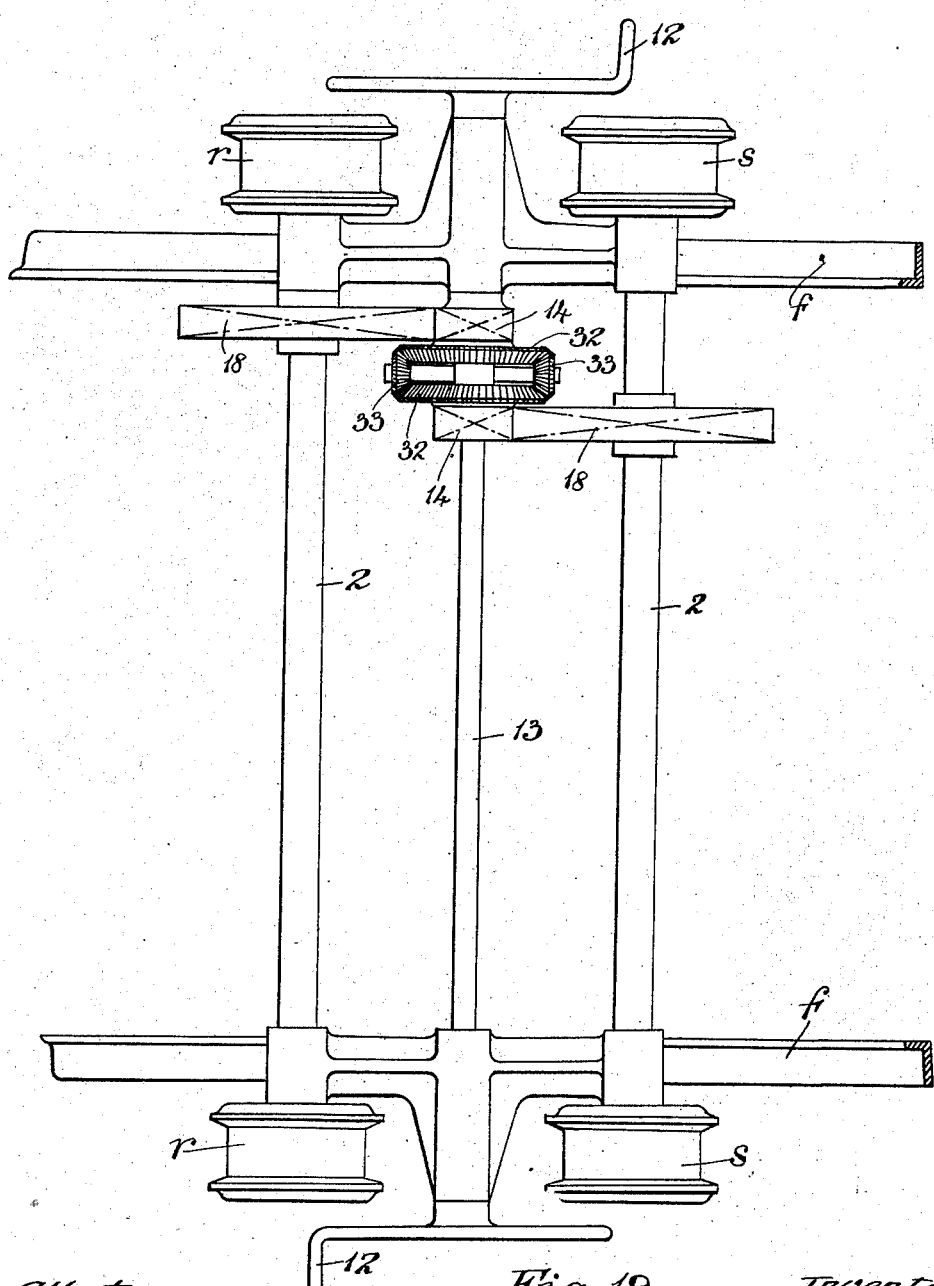

Figure 1 is a side elevation of the left-hand half of a railway hopper-wagon fitted with one form of door-operating gearing. Fig. 1ª is a view similar to Fig. 1 of the right-hand half of the same wagon. Fig. 2 is an elevation, on a larger scale, of one door and the gearing. Fig. 3 is a half-plan of the gearing corresponding to Fig. 2. Fig. 4 is a transverse sectional elevation on the line A B, Fig. 2. Figs. 5 and 5ª, 6 and 7 are detail views of the clutch-levers, rope-clip, and guide-pulley, respectively. Figs. 8 and 9 are sectional and side elevations, respectively, of one form of drum employed. Figs. 10 and 11 are side and sectional elevations of a modified form of drum, Fig. 12 being a diagrammatic plan illustrating the application of this type of drum. Figs. 13 and 14 show, respectively, in elevation and plan a form of rope-grip used when the modified form of drum is employed. Figs. 15 and 16 are a sectional elevation and plan, respectively, of a modified form of gearing, and Figs. 17 and 18 are similar views of another modified form of gearing. Fig. 19 is a diagrammatic plan illustrating the application of differential gear.

In carrying out the invention according to one modification in the application to a double-hopper wagon, as illustrated in Fig. 1, the hoppers $a\ b$ are fitted with doors $c\ d$, adapted to slide longitudinally toward or away from the center of the wagon. The doors are fitted with rollers $e$, resting on guide-rails $f$, carried in any suitable manner from the sides of the hoppers or from the vehicle-body. The rollers $e$ are preferably carried in suitable bearings on channel-irons $g$, forming the side girders or sills of the doors.

The doors $c\ d$ are operated by pairs of wire ropes or chain cables $h\ i$, respectively, there being two pairs of ropes to each door, one rope on each side. The ropes are attached to the doors by clipping devices, such as shown in detail in Fig. 6. These consist of brackets $k$, bolted to the doors, having V-guides $l$ alternating with screwed eyelets *m* on their upper faces. The ropes are led alternately over the V-guides and through the eyelets and firmly secured by tightening up the nuts *n* on the eyelet-bolts. As explained hereinafter, the door *c* is secured to the upper parts of the ropes *h* and the door *d* to the lower parts of the ropes *i*. For this reason the brackets *k* on the door *c* are much longer than the brackets *k* on the door *d*, the clipping device shown in Fig. 6 being intended to grip the upper part of the rope.

The ropes *h i* are led around fixed but adjustable guide-pulleys *p p* and onto winding-drums *r s*, respectively. The pulleys *p* are carried in bearings *t*, supported by adjustable bolts *w* in fixed brackets *x*, forming stops limiting the travel of the doors, the bearings *t* being preferably formed in one or connected by cross-bars *z*. By adjusting the bolts *w* the tension of the ropes may be regulated as desired. The winding-drums *r s* are carried on shafts 2 2, extending transversely across the wagon, preferably at the center thereof, as shown in Figs. 1 to 3. The construction of the drums according to one form will be understood on reference to Figs. 8 and 9, wherein one drum is illustrated, the other drums being identical therewith. A disk 3, a drum 4, and a second disk 5 are mounted on the end of the shaft 2, which is provided with a shoulder 6 to resist lateral movement of the disk 3 and is fitted with a feather or key 7 and a nut 8 and washer on the outer screwed end. The edges of the rim of the drum 4 are beveled and project into recesses 9 10, formed in the disks 3 and 5. The rope to be secured to the drum is first passed round once, so as to lie on the beveled edge opposite, say, the disk 3, once or twice round the drum 4, off to the door, and round the guide-pulley, back again to the drum, being wound once or twice about the drum 4, and finally round the beveled edge opposite the other disk 5, the free end and any excess length being passed through an opening 11 provided for that purpose. The nut 8 is then tightened up, whereupon the rope is firmly secured between the beveled edges of the drum 4 and the disks 3 and 5. The disk 5 on all the drums, or the disk on one drum on each side, may be suitably marked by arrows or words to indicate in which direction they should be rotated in order to open or close the doors.

The drums *r s* are rotated to open or close the doors by means of a hand-wheel 12 on a driving-shaft 13, Figs. 2 and 3, a pinion 14, on which gears into a wheel 15 on a central shaft 16, a second pinion 17 on which gears into a second wheel 18 on the shaft 2 of the drum *s*. A pinion similar to the pinion 17 is provided on the opposite end of the central shaft 16 to drive a wheel similar to the wheel 18 on the shaft 2 of the drums *r*. A hand-wheel 12 is provided on each end of the shaft 13, the near-side wheel being shown in Fig. 3 and the far-side wheel in Fig. 2, the near-side wheel being omitted in the latter figure for sake of clearness. If the pinions 17 were permanently fixed to the central shaft 16, both sets of drums *r* and *s*, and therefore both doors, would be simultaneously operated; but as it is sometimes desirable to operate the doors independently the pinions are adapted to be secured to the shaft by clutches, such as shown at 19, Fig. 3. These clutches are independently manipulated by levers 20 21, one on each side of the wagon, but each lever is connected to a free companion lever on the opposite side by a connecting-link 22 in order that either of the clutches may be manipulated from either side of the wagon.

It will thus be understood that the doors may be independently opened or shut in any desired order, or both may be opened or shut simultaneously, their operation being effected from either side of the wagon by a simple hand wheel or lever.

The ends of the ropes may be directly secured to the doors, in which case terminals of the kind shown in Figs. 13 and 14, and preferably a winding-drum of the type shown in Figs. 11 and 12, are employed. Each terminal comprises a knuckle-joint 23, bolted to a bracket 24, in turn bolted to the door.

The drum is of split formation, the meeting edges of the halves 25 being beveled or formed, as shown in Fig. 10, and helically arranged, as indicated at Figs. 10 and 12.

A rope is secured at one end to one terminal on the door, passed over a guide-pulley, next passed once or twice round one-half of the drum, then passed around and gripped in the helical groove, being secured therein by a tightening-nut 26. Leaving the groove at the point 27, Fig. 12, it is again passed once or twice over the drum, but on the opposite half, and its free end is finally secured by a second terminal on the door.

In a modified arrangement worm-gearing is substituted for spur-gearing, as shown in Figs. 15 and 16. Fig. 15 is an irregular section, the left-hand half being a section through the worm on the far side of the wagon and the other half a section through that on the near side. Fig. 16 shows the gearing on the near side, the worm being omitted for clearness. The hand-wheel 12 is secured to the shaft 13. A bevel-pinion 28 is loose on the shaft, but is adapted when required to be secured to it by a clutch 19, so as to gear with and drive a pinion 29 on a worm-shaft 30, the worm of which drives a worm-wheel 31 on the shaft 2 of the drum *s*. It will thus be seen that when the wheel 12 operates the drums *s s* the right-hand door is operated. In order to enable the left-hand drum and door to be operated, a clutch 19 and similar gearing 28 to 31 is provided on the far side to operate the drums r. To allow both doors to be independently operated in any order or to be simultaneously operated and also to allow such operation to be controlled from either side of the wagon, a set of duplicate clutch-levers 20 21 are provided similar to those already described with reference to Figs. 3, 5, and 5ª.

A further modified and simpler form of winch-gearing is illustrated in Figs. 17 and 18. Fig. 18 shows the gearing on the near side. The drums r s, preferably of the construction hereinbefore described, are mounted on shafts 2 2. These shafts are independently operated from shafts 13 13 through pinions 14 14, gearing directly with wheels 18 18 on said shafts 2 2. The shafts 13 extend across the wagon, and each carries a hand-wheel or a star-wheel 12 on each end. The star-wheels may be operated by lengths of tubing or other levers in the well-known manner. The arms of the star-wheels project radially and are outwardly inclined, so that though they lie wholly within the vertical plane defining the maximum width of the wagon the lever when in place projects beyond such plane describing a conical path when the shaft is rotated, the said path being clear of the sill of the wagon and of the adjacent star-wheel.

The above-described gearing is preferably employed with doors fitted with clips and arranged, as hereinbefore described with reference to Figs. 1 to 6.

In a still further modified form of gearing, such as shown diagrammatically in Fig. 19, a differential gear may be employed, so that as one door is locked or jammed the other door is opened at a speed twice as great as that at which it moves, if both doors open simultaneously. Similarly, if both doors are moving, but the resistance of one is greater than that of the other, the one of less resistance is opened at an increased speed. In this form of gearing a single driving-shaft 13 is provided with a hand-lever 12 on each end. Loose on the shaft are two pinions 14 14, gearing with wheels 18 18, keyed on the drum-shafts 2 2. Secured to or in one with each pinion is one element of an ordinary differential gear—in the form shown a bevel-wheel 32—the other elements—viz., planet-pinions 33—being carried on arms fixed to the shaft 13. Any other form of equivalent differential gear may be adopted.

It is preferred to use the above-described gear with drums, doors, and fittings such as hereinbefore described.

The hereinbefore-described methods of operating doors longitudinally of the wagon are equally applicable to the transverse operation of doors, it then being found preferable to place the drum-shaft at one side of the wagon and guide-pulleys at the other side, the drum-shaft being driven by a transverse worm-shaft fitted with suitable hand wheels or levers.

In any of the hereinbefore-described gears for operating the doors the drums may be replaced by suitably-sprocketed wheels engaging with chains in place of flexible wire ropes.

Having now described our invention, what we claim as new, and desire to secure by Letters Patent, is—

1. In railway and like double-hopper wagons wherein the doors are operated by flexible winding-gear, two sets of winding-gear, one for each door, adapted to be either independently or simultaneously operated from the same driving-shaft, substantially as hereinbefore described.

2. In railway and like double-hopper wagons, the combination of two sets of winding-gear for operating the doors, and clutches and levers adapted to be manipulated from either side of the wagon to throw either or both the gears into connection with a driving-shaft whereby the gears may be either independently or simultaneously operated, substantially as hereinbefore described.

3. In railway and like double-hopper wagons wherein the doors are operated by flexible winding-gear two sets of winding-gear one for each door, adapted to be either independently or simultaneously operated from the same driving-shaft, and means for operating the said shaft from either side of the wagon substantially as described.

4. In an apparatus for simultaneously operating two doors of a hopper-wagon, a set of winding-gear for each door and a differential gear between the two sets of winding-gear, substantially as described.

5. In an apparatus for operating the door of a hopper-wagon, a winding-drum and pulley mounted on the wagon-body upon opposite sides of the door, means for operating the winding-drum, means upon said drum for gripping the cable after it has been wound thereon substantially as described.

6. In an apparatus for operating the door of a hopper-wagon, a winding-drum and pulley upon the wagon-body on opposite sides of the door, a cable passing over said drum and pulley, a clipping device upon the door for securing the cable thereto consisting of a bracket secured to the door, V-shaped projections thereon, screw-eyes alternately arranged between the projections, the shanks of said eyes passing through the bracket and nuts screwed thereon, the said cable being arranged to pass through the eyes and gripped down into the recess of the V-shaped projections by tightening the nuts on the shanks of the eyes, substantially as described.

7. In combination with the wagon, the door, a winding-gear comprising a flexible connection and means for clipping said flexible connection to the door comprising a recessed projection for receiving the flexible connection and a screw-eye through which the flexible connection passes, said screw-eye being adjustable in relation to the recessed projection and arranged adjacent thereto, substantially as described.

8. In combination with a hopper-wagon having a door, a cable connected thereto, a winding-drum formed in sections and receiving the cable between them, means for adjusting the said sections to clamp the cable between them and means for operating the drum substantially as described.

In witness whereof we have hereunto set our hands in the presence of two witnesses.

GEORGE HARRISON SHEFFIELD.
JAMES DENIS TWINBERROW.

Witnesses to the signature of the said George Harrison Sheffield:
MALCOLM MCVITTIE,
JOHN JONES BRITTAIN.

Witnesses to the signature of the said James Denis Twinberrow:
JOHN SANDEN KIRKPATRICK,
LÉON PIÉRARD.